E. L. MEGILL.
APPARATUS FOR TREATING HOUSE WASTE OR SEWAGE.
APPLICATION FILED JULY 14, 1915.
1,224,483.
Patented May 1, 1917.
4 SHEETS—SHEET 1.
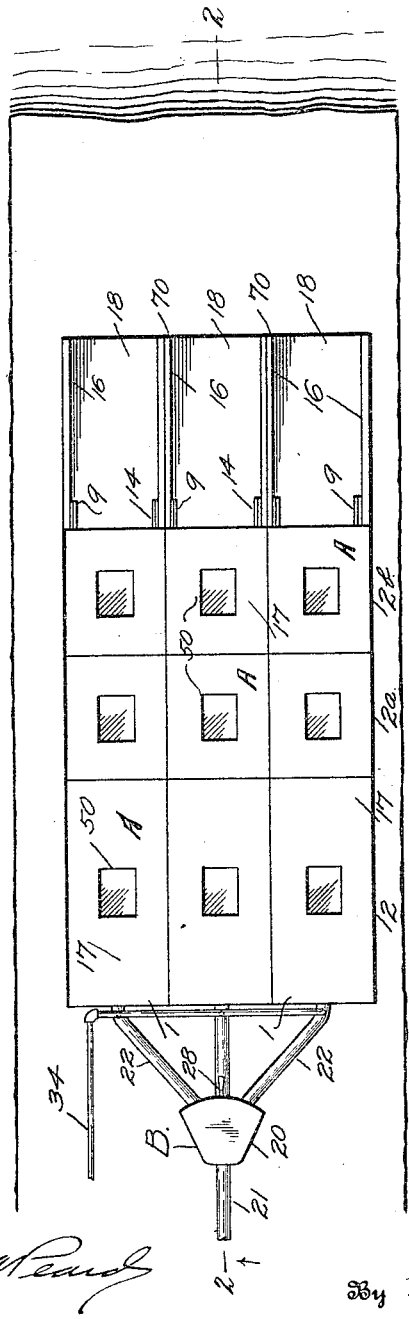
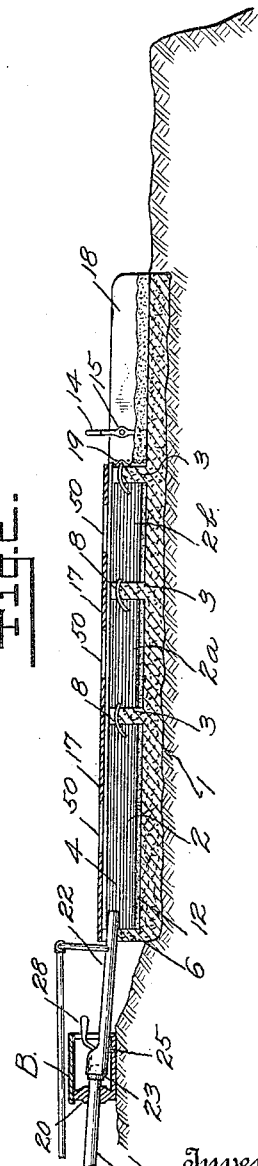

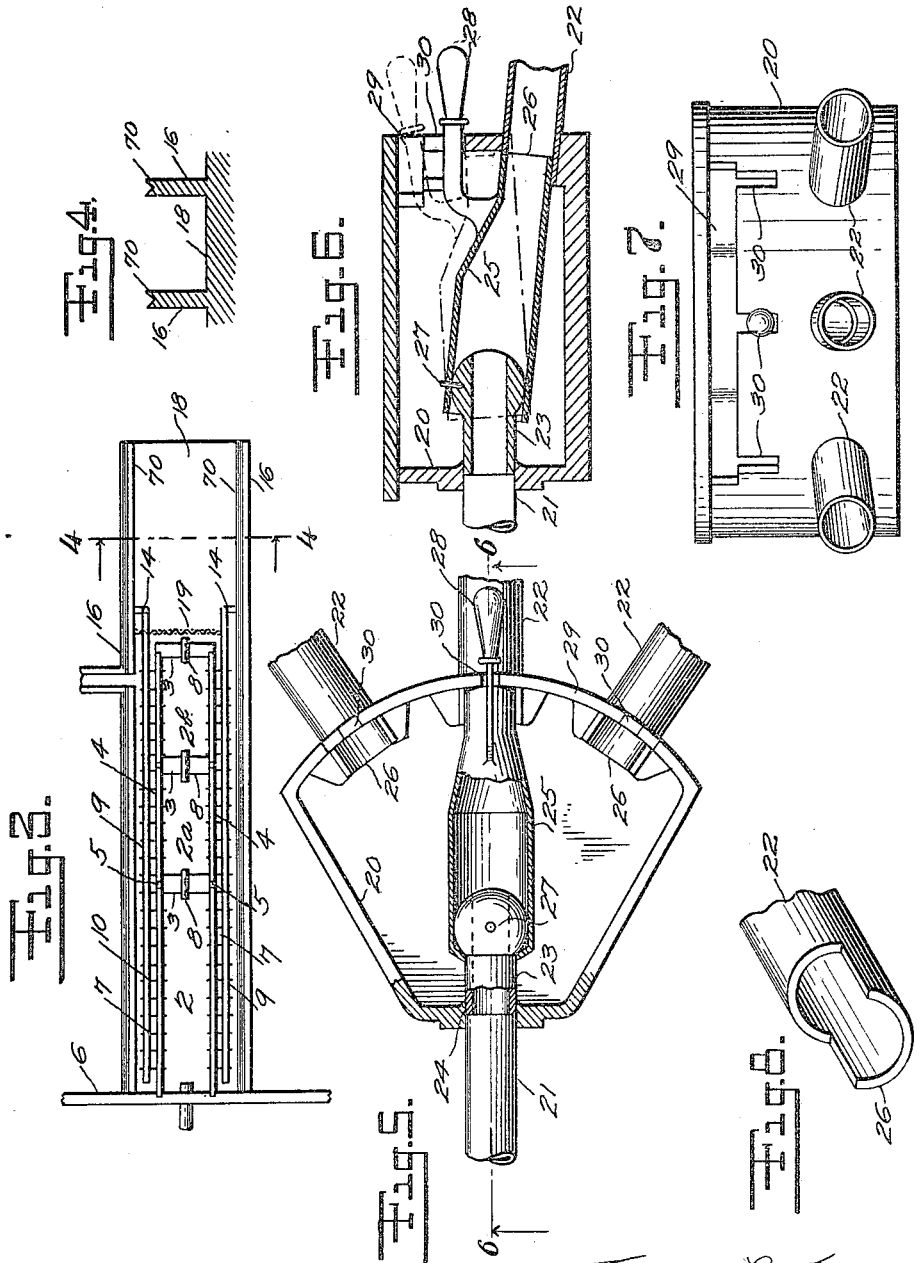

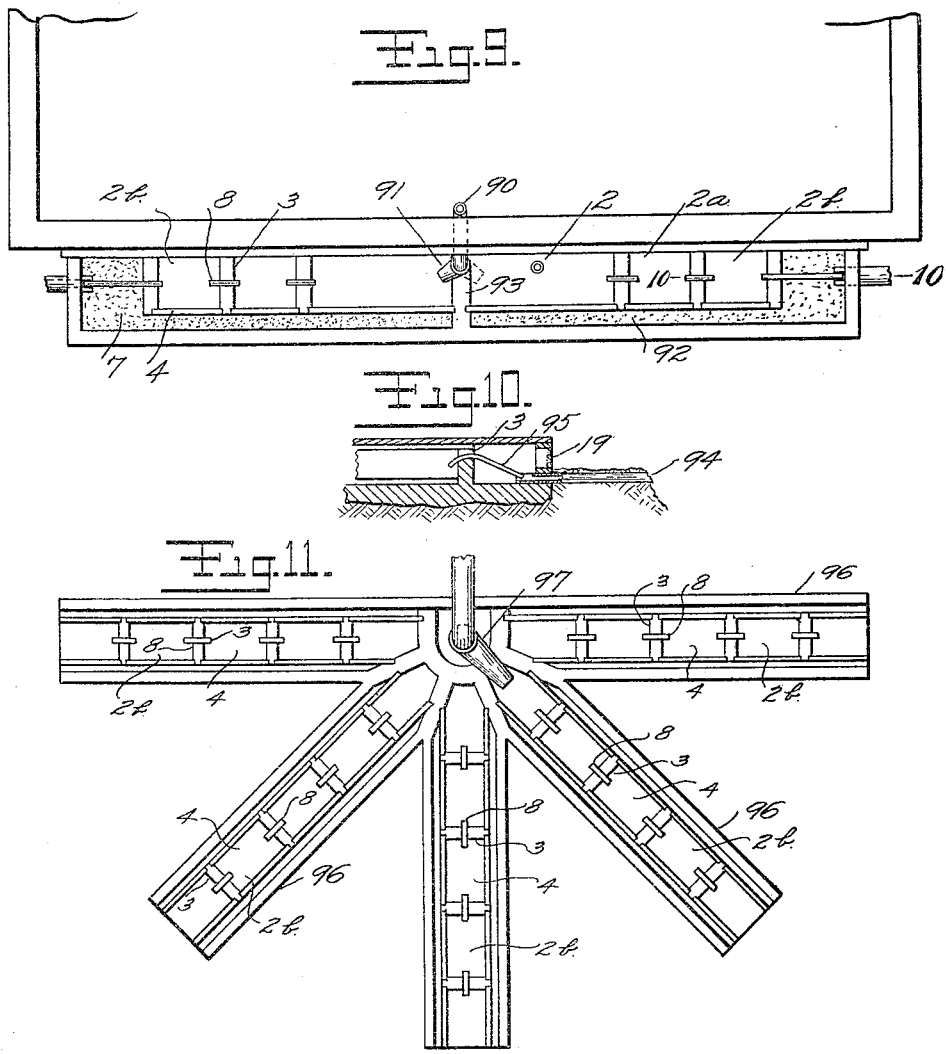

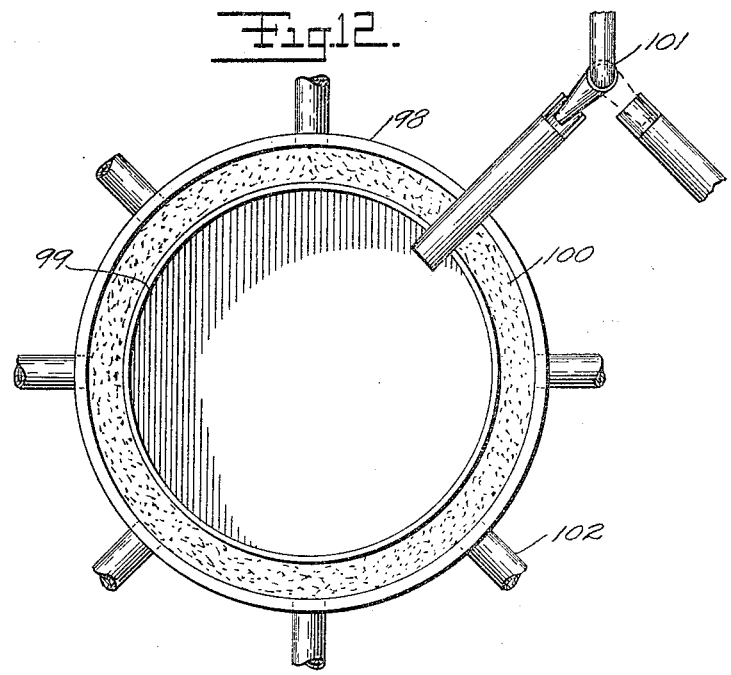
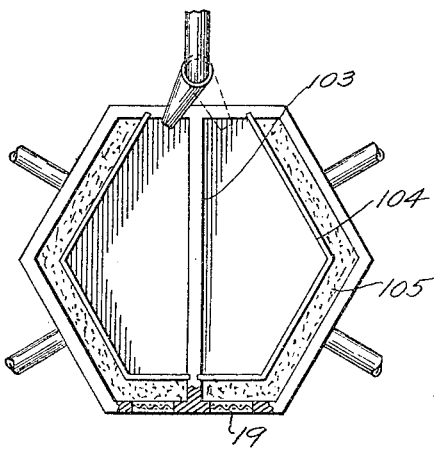
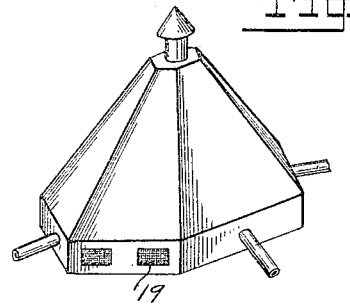

UNITED STATES PATENT OFFICE.

EDWARD L. MEGILL, OF NEW YORK, N. Y.

APPARATUS FOR TREATING HOUSE WASTE OR SEWAGE.

1,224,483.      Specification of Letters Patent.      Patented May 1, 1917.

Application filed July 14, 1915. Serial No. 39,781.

*To all whom it may concern:*

Be it known that I, EDWARD L. MEGILL, a citizen of the United States, residing at New York, in the county of New York, and State of New York, have invented certain new and useful Improvements in Apparatus for Treating House Waste or Sewage, of which the following is a specification.

This application is in part for the same subject-matter as was disclosed in my former applications Serial No. 684,955 filed March 20th, 1912, and Serial No. 802,881 filed November 25th, 1913.

This invention relates to apparatus for treating house waste or sewage, and is designed to take the place of the ordinary cess-pool or septic tank, or other sewage systems at present in use.

It is a fact that the waste discharged from a dwelling consists largely of water, which is the most convenient vehicle for carrying the waste out of the house. Furthermore, the waste itself is largely water, and the proportion of organic or solid matter is very small. Under the present practice the waste, so largely diluted with water is most generally run into a cess-pool, which is a ground-tank and whose bottom is not sealed. The theory is that the solids will remain in the tank, while the water seeps out into the surrounding earth. The difficulty is that the waste in such a contrivance is without access of air, is substantially sealed up, becomes putrescent because of the very fact of the presence of water, and when and if it does make its escape into the surrounding earth, makes its way in the form of a most noxious liquid, because the solid particles having been confined for so long with water have an opportunity to liquefy. The septic tank idea is open to the same objection, because it is a sealed tank and the material is held in it until the solids liquefy, so that when the tank is discharged, although the liquid that runs off may be clear, it is nevertheless most objectionable.

By my invention I propose to take the waste at the very moment of its discharge from the house and begin forthwith the process of separating the very slight solid content from the water. The apparatus which I employ includes an outside tank or receptacle having a sealed bottom, and a second receptacle within the first, the second receptacle having its walls spaced from those of the first receptacle, and the second receptacle having communication with the first by way of an opening or openings along the bottom walls of the second receptacle. The space or spaces between the two receptacles is filled with sand or the like filtering material, and the discharge of the matter to be treated is into the second or inner receptacle. From this inner receptacle the liquid constituents find their way through the openings at the lower ends of the walls of the inner receptacle, through the sand which is packed between the two receptacles, and then out through a suitable discharge. The solids remain within the inner receptacle, their escape prevented by the sand barrier. On account of the particular arrangement, the path of the liquids in their first separation from the solids is not downward, and advantage is thus taken of the force of gravity to maintain the solids within the inner receptacle. While this separation is going on, I provide for the ventilation of the apparatus, so that oxidation and nitrification may take place to the fullest extent. I contemplate also that the receptacles, and the apparatus in general, shall be shallow, as distinguished from the deep tanks and pits heretofore employed, so that the liquids after their separation, may be spread over an extended surface, to give the air the fullest opportunity for its purifying action thereupon. I also provide for affording to the apparatus the necessary periods of rest, by arranging two sets of receptacles, and discharging the house waste into them in alternation. Furthermore, I provide for irregularity in the quantity of waste discharged from the house, by providing within such an outside receptacle as I have referred to, a plurality of inner receptacles, and arranging for the overflow from one inner receptacle to the next inner receptacle, in case the discharge from the house is for the moment too excessive to be taken care of by a single inner receptacle. Other features of the invention, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings which are to be taken as a part of this specification, and in which I have shown apparatus adapted for the carrying out of my process, Figure 1 is a plan view of a sewage disposal apparatus within my invention; Fig. 2 is a vertical section on the line 2—2 of Fig. 1, looking in the direction of the arrows; Fig. 3 is a plan view of one of the units of the apparatus of Fig. 1, with the cover removed; Fig. 4 is a vertical section on the line 4—4 of Fig. 3; Fig. 5 is a view on an enlarged scale of the alternating device of Figs. 1 and 2, with the cover removed; Fig. 6 is a vertical section on the line 6—6 of Fig. 5, looking in the direction of the arrows, the cover 31 being added to this figure; Fig. 7 is an end view of the alternating device as it appears when looked at from the right hand side in Fig. 5; Fig. 8 is an enlarged perspective view of the end of one of the pipes 22; Fig. 9 is a top plan view of a modified arrangement of apparatus within my invention; Fig. 10 is a sectional view taken on the line 10—10 of Fig. 9; Fig. 11 is a top plan view of another modification of the apparatus; Fig. 12 is a top plan view illustrating still another modification; Fig. 13 is a view similar to Fig. 12, showing another modified form of apparatus; and Fig. 14 is a perspective view showing a cover or housing for the form of apparatus shown in Fig. 13.

Referring first to the form of apparatus shown in Figs. 1 to 8 inclusive, it comprises a plurality of units A arranged in parallel. B is what I have called an alternating device for delivering the sewage or waste from the house at will to one or the other of the units A, thereby providing for the operation of one of the units while the others are resting, or being cleaned or replenished with sand. Each unit A consists of a trough 1, preferably of concrete, the said troughs being disposed side by side, as shown. These troughs may incline downwardly from the sewage delivery alternating device B, in order to facilitate the movement of the liquid through the device, and which open at their far ends for the final discharge of the liquid. Each of these troughs constitutes what I shall refer to as an outside receptacle, and within each of these outside receptacles is a plurality of inner receptacles 2, 2$^a$, and 2$^b$, which receive the waste as it is discharged from the house. These inner receptacles are made up as follows: 3—3 are concrete cross-pieces within the trough or outer receptacle, which extend in quite to the side walls of the trough, and these cross walls 3—3 are suitably spaced apart; 4—4 are removable side boards whose ends slide down into suitable vertical grooves 5 at the ends of the cross-pieces 3, as well as in the face of the concrete end wall 6 at the upper end of the trough. Thus is provided a series of receptacles down the middle of each trough, separated from each other by the cross walls 3 and separated from the sides of the outside receptacle or trough by alleys 7. It is preferred, as shown in the drawings, that the first inner receptacle 2 in each trough shall be considerably longer and therefore larger than the others, because it is this receptacle which initially receives the waste and takes out the bulk of the solids.

The successive inner receptacles in each trough communicate with each other by means of liquid overflow connections, each comprising a pipe 8 extending through a hole in the particular cross wall 3, so that no receptacle will at any time fill to overflowing, but the excess liquid will flow through the pipe 8 into the succeeding inner receptacle. The rear ends of the pipes 8 are bent downwardly to tap the liquid under the surface and thereby avoid as far as possible the passage of the surface-flooding solids and grease from one inner receptacle to the next. The grooves 5 do not extend all the way to the concrete or cement floor of the trough, with the result that the side boards 4 are held away from the floor to the extent of a space of about one inch between the bottom edges of the side boards and said floor, as indicated at 12. 9—9 are reciprocatable rakes, one in the bottom of each alley 7, having teeth 10 extending into the aforesaid spaces 12, to agitate the sand material in said spaces and the alleys 7, as hereinafter explained. These rakes are pivotally connected to the lower ends of upright handles 14, which, in turn, are pivoted intermediate their ends to pins 15 projecting inwardly from the side walls 16 of the troughs. 17—17 are rain-tight covers over the troughs and their respective inner sewage receptacles. These covers rest upon the tops of the walls 6 and 16 of the outside receptacles or troughs and preferably drain the rain water to the side walls 16, which have preferably raised gutters 70, indicated in Fig. 4, which deliver the water to the lower uncovered ends 18 of the troughs, which it will be noted extend beyond the last receptacle 2$^b$ and beyond the covers 17. 19—19 are insect-excluding screens across the troughs or outer receptacles, immediately beyond the last inner receptacles 2$^b$, and under the ends of the covers 17. It will be noted that the covers for each trough are preferably in sections corresponding to the number and extent of the inner receptacles 2, 2$^a$, 2$^b$, of that particular trough, so that any of the inner receptacles can be exposed at will.

The waste is delivered initially into the first receptacle 2 of the unit A which happens to be in use, from the alternating device B. This latter device has a preferably concrete or cast iron chamber 20 having a hole 24 in one wall with which is connected the delivery end of the soil pipe 21 that delivers the sewage from the house. From holes in the opposite wall of this chamber extend pipes 22 which connect with chamber 20 with the first inner receptacle 2 in the respective troughs or outer receptacles, through holes provided for the purpose in the end wall 6. 23 is a pipe having a ball-shaped end projecting into the chamber 20 through the aperture 24. 25 is a swivel pipe having one end telescoped over the ball-shaped end of the pipe 23, and adapted at its other end to drop into the end of any one of the respective pipes 22, the ends of these pipes 22 being cut away at 26 (Figs. 6 and 8) for this purpose. The ball-joint 23 permits the pipe 25 to be swiveled or swung to connect its lower or delivery end with any one of the pipes 22 at will. To prevent endwise displacement of the pipes 25, a loose lever or pin 27 is provided, which projects from the top of the wall 23 through the wall of the pipe 25.

28 is a handle on the delivery end of the pipe 25 projecting through a horizontal slot 29 in the wall of the chamber 20, and having downwardly extending notches 30 corresponding in location to the pipes 22, so that the user of the apparatus, without removing the lid 31 of the alternating chamber 20, can alternate the delivery of the sewage from one unit A to another by merely lifting the handle 28 up out of the given notch 30, swinging it horizontally in the slot 29, and dropping it down into the desired notch 30. It will be noticed that there is a downward incline from the soil pipe 21 through the pipes 25 and 22 to the units A, which gives a gravity flow of the sewage and prevents leakage at the ball-joint 23, even though the latter be not absolutely tight-fitting.

In the use of this particular apparatus, the bottoms of the several receptacles 2, 2ª, 2ᵇ, are covered with about a half inch of sand, and the alleys 7 and the open trough space 18 at the end of each unit A, are filled with sand to a depth approximately the level of the sewage in the first receptacle 2 when the latter has been filled and is overflowing into the next receptacle 2ª by way of the connecting pipe 8. The alternator handle 28 is operated to connect the soil pipe with one of the units A. If there be sufficient volume of sewage to more than fill the receptacle 2, the excess overflows by pipe 8 into the inner receptacle 2ª, and thence if necessary into inner receptacle 2ᵇ. The sewage will not stand in these inner receptacles as it does in a cesspool, but the liquids immediately begin to drain off through the spaces under the boards 4 into the alleys 7. They then rise through the sand in the alleys to the approximate level of the liquid in the inner receptacles, and at the same time flow through the sand toward the open lower end of the trough into and through the sand in the open air bed 18, whereby they are further filtered and purified, with oxidation and nitrification. In case the sand-like material becomes clogged it may be readily loosened by working the handles of the rakes 9.

Ventilation, aeration, nitrification and oxidation are effected as by means of the pipe 34 which is connected to the several pipes 22. Inasmuch as these pipes 22 have their discharge ends above the level of the liquid in the inner receptacles into which they discharge, and inasmuch as the cross walls 3 and the side boards 4 do not extend fully up to the covers of said inner receptacles, air may pass through the screen 19, over the contents of the several receptacles, out through the pipes 22 and into the pipe 34, which may be extended upwardly alongside of or into the chimney or ventilating pipe of the house, the natural draft thus induced creating a current of air through all of the units, and conducting away any slight odors which may be present.

The alternating device should preferably be operated occasionally to divert the house waste into another unit, giving the unit last used an opportunity to rest and so permit the contained solids to dry on the bed, especially of the first receptacle 2 of that unit, and to permit them to oxidize and purify in the air which is constantly circulating over and through the troughs; and further, to permit the liquids to slowly filter through the sand in the alleys and in the fully exposed section 18 and out of the lower end of the trough into the open ground, by which time the liquids will have been rendered clear and innocuous and may be run into a stream, if one be conveniently at hand; or they may be permitted merely to sink into the ground, or may be distributed through an underground open tile system with ramifying branches, or otherwise suitably disposed of. Sight openings 50 protected by glass may be provided in the covers 17 through which the condition of the contents of the inner receptacles may be determined, or a larger portion of the covers may be of glass for this purpose and for the additional and important purifying chemical effect of the admitted light upon the contents of the receptacles.

At suitably long intervals, whenever necessary, any unit may be cleaned by removing its covers and shoveling out the contents, a layer of dirt being thrown over the solids before shoveling them out; the product makes a splendid inoffensive fertilizer. Some at least of the liquid running off from the troughs may be collected for use as an excellent nutriment in the garden.

The entire apparatus is preferably only about one foot in height, but extensive in area, and may be dropped below the surface of the ground so that it cannot be seen and will nevertheless give the necessary gravity run from the soil pipe. There will be practically no evidence of the presence of the apparatus, except for the covers 17, and further concealment may be had by surrounding the apparatus with a growth of hedge or the like.

I prefer that the rain water from the roof shall not be discharged into the apparatus, so as to avoid needless taxing of the same in draining and filtering so much practically pure water. The sewage, with the use of my apparatus, is not held or stored up in any sense, but from the moment of its discharge from the house begins to separate and no opportunity is given for the liquefaction of the solids, as is the case in the ordinary cesspool or septic tank. The final discharge from the apparatus may be into any available ground that will absorb or carry off ordinary water or rainfall, because the liquid discharge or effluent from the units A is quite innocuous and free from putrescent or putrescible matter. I have described the apparatus as being arranged upon an incline, in order to secure a gravity flow of the liquid, but it will be evident that this is not absolutely necessary, so long as there is a sufficient drop from the lower or discharge end of the apparatus. It is desirable that the troughs of my apparatus shall be located side by side, as in the drawings, to save space and to make each party wall serve for the two walls which would otherwise be necessary. However, this is obviously not essential to the operation of the invention, and it is likewise not essential, though it is desirable, that the sides of the trough be actually straight or parallel, or that said troughs, or indeed the other parts of the apparatus shall be built precisely as shown.

The name "side boards" applied to the members 4 does not mean that these members are necessarily made of wood. On the contrary, they may consist of slabs of concrete or may be made of sheet metal. The reason for having these side boards 4 removable is to permit the sand from the alleys to be quickly spread over the bottoms of the troughs so that it may be cleaned and renovated by running clean fresh water into the trough, after which the sand may be exposed to the sun and fresh air and so completely renovated in order that it may be used over and over again.

One of the essentials of the device thus far described and of the method of using it is that there be provision for beginning the separation of the waste into its solid and liquid constituents as soon as it is discharged from the soil pipe. Another essential is that the waste be discharged into one receptacle and find its way through the bottom of that receptacle and through a wall of sand covering the passage between the inner receptacle and the outer receptacle and filling the space between them; and another important feature is that the liquid, upon leaving the inner receptacle, does not travel downwardly, so that the force of gravity assists in preventing the movement of any solids from the inner receptacle through the barrier sand filter into the outer receptacle.

In Fig. 9 I have shown a modified arrangement. In that figure there is indicated at 90 a soil pipe, and there is an alternator 91. This alternator may be turned to the left or to the right and discharges into one or the other of a right hand and left hand series of inner receptacles 2, 2$^a$, 2$^b$, each of such series being inclosed within an outer receptacle 92, which is divided into two parts by means of a party wall 93. The inner receptacles 2, 2$^a$, 2$^b$, are separated by means of cross walls 3 as in the form already described, and there are also provided the overflow pipes 8. These inner receptacles 2, 2$^a$, 2$^b$, are not, however, spaced apart from both side walls of the outer receptacle 92, but one of the side walls of the outer receptacle 92 constitutes also in this case the side wall of the several inner receptacles, and there is provided an alley 7 between the other outer wall of the outside receptacle 92, and the several inner receptacles. Also in Fig. 9, the outer receptacle extends beyond the last inner receptacle 2$^b$ of each series, and the space between the end walls of the outer receptacle and the end walls of the receptacles 2$^b$ is also filled with sand and is in effect a continuation of the alleys 7. The discharge from the several inner receptacles into the sand alley is through a slot formed between the lower edges of the side boards 4 and the bottom of the inner receptacle 92, as in the other form of the apparatus before described, and the flow of liquid from the sand filter is out through a pipe 94 which is on a level with the bottom of the outside receptacle 92. There is also a pipe 95, whose rear end is extended through the cross wall 3 at the end of the inner receptacle 2$^b$, and whose lower end discharges at a lower level into the sand filter between the end of the inner receptacle 2$^b$ and the end of the outer receptacle 92.

In Fig. 11 there is shown a still further modification, in which the several series of inner receptacles 2, 2$^a$, 2$^b$ and 2$^c$ are disposed in a radially arranged plurality of troughs or outer receptacles 96, the alternator 97 being swung from one to another of these troughs as described.

In Fig. 12 there is shown a form of device which may be called a single unit. Here there is an outside receptacle 98 which has a sealed bottom, and in this outside receptacle there is positioned an inner receptacle 99, with a space between them for sand 100. The only communication between the receptacles 98 and 99 is through a suitable opening or openings at the bottom of the inner receptacle 99, through which liquid discharged into the inner receptacle from a pipe 101 finds its way, rising up into the sand and being discharged through a multitude of pipes 102 which enter the wall of the outside receptacle 98. This form of device is very simple and cheap to manufacture, because the inner receptacle can be readily removed.

In Fig. 13 there is a form of device similar to that shown in Fig. 12, but with the difference that the inner as well as the outer receptacle is divided into two parts, so that one part may be in operation while the other is resting. The dividing wall is indicated at 103, the inner receptacle at 104, and the sand barrier at 105. This form of the device, as well as that shown in other figures of the drawing is preferably provided with the screen 19 previously described, and provision is made so that air drawn in through these screens 19 may pass over the surface of the liquid within the inner receptacle or receptacles and of the sand barrier, and out through a ventilating pipe or chimney. And in Fig. 14 there is shown a form of housing which may be placed over the apparatus shown in Fig. 13, with a ventilation cowl at the top.

It will be evident that the method herein described may be practised in other ways than that which I have illustratively described, and also that the construction of the apparatus may be almost infinitely varied.

Therefore, inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. In sewage disposal apparatus the combination of a plurality of downwardly tending troughs open for the delivery of liquid from their lower ends, sewage-receiving receptacles in the troughs having horizontally elongated side outlets near their bottoms for delivering the liquid from the sewage to the respective troughs; sand-like material in the troughs adjacent said receptacles to the approximate liquid level of the sewage upon delivery into the receiving receptacles; and horizontally reciprocatable rake means in the sand of the troughs having teeth which enter the aforesaid side outlets in the receptacles.

2. In sewage disposal apparatus the combination of a plurality of downwardly tending troughs open for the delivery of liquid from their lower ends; a succession of rectangular sewage-receiving receptacles extending down the middle of the respective troughs, successive receptacles being connected with each other by liquid overflow-connections, the sides of said receptacles having horizontally elongated liquid outlets near their bottoms, sand-like material in the alleys between the sides of the troughs and the sides of the receptacles, and rake-means for agitating the sand-like material in said horizontally elongated liquid outlets.

3. A unit of a sewage disposal system comprising a downwardly tending trough open for the delivery of the liquid from its lower end, a plurality of rectangular sewage-receiving receptacles arranged in succession down the middle of said trough to leave alleys between the sides of the receptacles and the sides of the trough, said sides of the receptacles being removable and having openings through them at the bottom, and the ends of the receptacles having liquid overflow openings through them which connect successive receptacles.

4. A unit of a sewage disposal system comprising a downwardly tending trough open for the delivery of the liquid from its lower end, a plurality of rectangular sewage-receiving receptacles arranged in succession down the middle of said trough to leave alleys between the sides of the receptacle and the sides of the trough, said sides of the receptacles being removable and having openings through them at the bottom, and the ends of the receptacles having liquid overflow openings through them which connect successive receptacles; a cover resting upon the sides of said trough, the sides and ends of the sewage-receiving receptacles being less deep than the sides of the trough so that they are not sealed by said cover; and the lower end of the trough extending beyond the last sewage-receiving receptacle and beyond the cover and being adapted to receive sand-like material to provide a final filtration in the trough open to light and air.

5. Sewage disposal apparatus comprising the combination of a trough open for the delivery of liquid from its lower end, a sewage-receiving receptacle in said trough with a side alley between them, said receptacle near its bottom having an outlet for the delivery of the sewage-liquid from the receptacle to the aforesaid alley.

6. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage-liquid from the receptacle to the aforesaid alley.

7. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage-liquid from the receptacle to the aforesaid alley, and sand-like material in said alley.

8. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage-liquid from the receptacle to the aforesaid alley, and deep filter material in said alley.

9. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage-liquid from the receptacle to the aforesaid alley, deep filter material in said alley, and shallow filter material in the receptacle.

10. Sewage disposal apparatus comprising the combination of a downwardly tending trough open for the delivery of liquid from its lower end, a plurality of sewage-receiving receptacles arranged in succession down the interior of said trough with a side alley between them and the side of the trough, the sides of said receptacles having outlets at the bottom for delivering the sewage-liquid from the receptacles to the alley, and the ends of the receptacles having liquid overflow connections with each other.

11. Sewage disposal apparatus comprising the combination of a downwardly tending trough open for the delivery of liquid from its lower end, a sewage-receiving receptacle in said trough with a side alley between them, the sides of said receptacle near its bottom having a horizontally elongated outlet for the delivery of the sewage liquid from the receptacle to the aforesaid alley, sand-like material in said alley, and horizontally reciprocatable rake means in the alley having teeth which enter the aforesaid side outlet in the receptacle.

12. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage liquid from the receptacle to the aforesaid alley, sand-like material in the alley, and sand-like material filling the delivery end of the trough beyond the receptacle.

13. Sewage disposal apparatus comprising the combination of a downwardly tending trough open for the delivery of liquid from its lower end, a sewage-receiving receptacle in said trough with a side alley between them, said receptacle near its bottom having an outlet for the delivery of the sewage-liquid from the receptacle to the aforesaid alley, sand-like material in said alley, rain-excluding covering means for said trough, and insect-excluding means at the open end thereof.

14. Sewage disposal apparatus comprising the combination of a downwardly tending trough open for the delivery of liquid from its lower end, a sewage-receiving receptacle in said trough with a side alley between them, the receptacle near its bottom having an outlet for the delivery of the sewage liquid from the receptacle to the alley, sand-like material in the alley, covering-means for said trough and receptacle but which does not seal the top of the receptacle but on the contrary permits air circulation thereto.

15. Sewage disposal apparatus comprising the combination of a downwardly tending trough open for the delivery of liquid from its lower end, a sewage-receiving receptacle in said trough with a side alley between them the receptacle near its bottom having an outlet for the delivery of the sewage-liquid from the receptacle to the alley, sand-like material in the alley, covering means for said trough and receptacle which does not seal the top of the receptacle but on the contrary permits air circulation thereto, and means for creating a circulation of air through the trough.

16. Sewage disposal apparatus comprising the combination of a downwardly tending trough open for the delivery of liquid from its lower end, a sewage-receiving receptacle in said trough with a side alley between them, said receptacle near its bottom having an outlet for delivering the sewage liquid from the receptacle to the alley, sand-like material filling the delivery end of the trough beyond the receptacle, and a covering for said trough which extends over the receptacle but not over the sand-like material in the trough beyond the receptacle.

17. Sewage disposal apparatus comprising the combination of a plurality of units each adapted to filter the sewage and subject to dry oxidation, said units being arranged in parallel, an alternating device for delivering the sewage to any one of said units at will comprising a chamber into which the delivery end of the soil pipe is adapted to project, independent pipe connections between said chamber and the units, and a swivel pipe in the chamber adapted to be swiveled on the end of the soil pipe to connect it at will with any one of the aforesaid independent pipe connections in the chamber.

18. Sewage disposal apparatus comprising the combination of a plurality of units each adapted to filter the sewage and subject to dry oxidation, an alternating device for delivering the sewage to any one of said units at will comprising a chamber into which the delivery end of the soil pipe is adapted to project, independent pipe connections between said chamber and the units, and a swivel pipe in the chamber adapted to be swiveled on the end of the soil pipe to connect it at will with any one of the aforesaid independent pipe connections in the chamber.

19. Sewage disposal apparatus, comprising the combination of a series of receptacles in communication one with the other near their upper ends, and filtering troughs in communication with opposite sides of each of said receptacles.

20. Sewage disposal apparatus, comprising the combination of a series of receptacles in communication one with the other near their upper ends, and filtering troughs in communication with opposite sides of each of said receptacles adjacent the bottoms thereof.

21. Sewage disposal apparatus, comprising the combination with a series of receptacles in communication one with the other near their upper ends, and filtering troughs in communication with opposite sides of each of said receptacles, the connections between said receptacles comprising overflow pipes which are downwardly bent into adjoining receptacles.

22. In a device of the kind described, an outside tank or receptacle having a sealed bottom, and a second receptacle within the first, the second receptacle having its walls spaced from those of the first receptacle, and having communication with the first receptacle by way of an opening or openings along the bottom walls of the second receptacle, a body of sand or the like filtering material in the spaces between the two receptacles, and a conduit discharging into the second receptacle.

23. In a device of the kind described, an outside tank or receptacle having a sealed bottom, a plurality of receptacles within said outside receptacle, each of said plurality of receptacles having its walls spaced from those of the outside receptacle and each having communication with the outside receptacle by way of an opening or openings along its bottom walls, a body of sand or the like filtering material between adjacent ones of said plurality of receptacles and the walls of the outside receptacle, a conduit discharging into one of said plurality of receptacles, and conduits connecting said plurality of receptacles one with another.

24. In a device of the kind described, an outside tank or receptacle having a sealed bottom, and a plurality of receptacles therein spaced from the outside receptacle, said plurality of receptacles being in communication with each other, and each of said plurality of receptacles having communication with the outside receptacle by way of an opening or openings along its bottom walls, a body of sand between said plurality of receptacles and the walls of the outside receptacle, and a conduit discharging into one of said plurality of receptacles.

25. In a device of the kind described, an outside receptacle having a sealed bottom, a second receptacle within the first and having its walls spaced from those of the first receptacle, the second receptacle having communication with the outside receptacle by means of an opening or openings along its bottom walls, a body of sand or the like filtering material in the spaces between the two receptacles, a conduit discharging into the inner receptacle, and a removable cover for the apparatus, suitable openings being provided in the walls of the outer receptacle for permitting ventilation.

26. In a device of the kind described, an outside receptacle having a sealed bottom, a second receptacle within the first and having its walls spaced from those of the first receptacle, the second receptacle having communication with the outside receptacle by means of an opening or openings along its bottom walls, a body of sand or the like filtering material in the spaces between the two receptacles, a conduit discharging into the inner receptacle, a removable cover for the apparatus provided with a window, suitable openings being provided in the walls of the outer receptacle for permitting ventilation.

27. In a device of the kind described, an outside receptacle having a sealed bottom, an inside receptacle having its walls spaced from those of the outside receptacle, said inside receptacle having communication with the outside receptacle by way of an opening or openings along the bottom walls of the inside receptacle, a body of sand or the like filtering material in the spaces between the two receptacles, a conduit discharging into the inside receptacle, a cover for the apparatus, a ventilation pipe communicating with one end of the apparatus, the outside receptacle being provided with another opening for the admission of air.

28. In a device of the kind described, an outside receptacle having a sealed bottom, an inside receptacle having its walls spaced from those of the outside receptacle, said inside receptacle having communication with the outside receptacle by way of an opening or openings along the bottom walls of the inside receptacle, a body of sand or the like filtering material in the spaces between the two receptacles, a conduit discharging into the inside receptacle, a cover for the apparatus, a ventilation pipe communicating with one end of the apparatus, the outside receptacle being provided with another opening for the admission of air and a screen over said second named opening.

In testimony whereof I affix my signature.

EDWARD L. MEGILL.

Copies of this patent may be obtained for five cents each, by addressing the "Commissioner of Patents, Washington, D. C."